United States Patent
Wang et al.

(10) Patent No.: US 12,301,680 B2
(45) Date of Patent: May 13, 2025

(54) SERVICE PROVIDING SYSTEM AND METHOD, NON-TRANSITORY, COMPUTER-READABLE STORAGE MEDIUM

(71) Applicants: Tse-Chuan Wang, Yilan County (TW); Hung-Yun Hsieh, Taipei (TW)

(72) Inventors: Tse-Chuan Wang, Yilan County (TW); Hung-Yun Hsieh, Taipei (TW)

(*) Notice: Subject to any disclaimer, the term of this patent is extended or adjusted under 35 U.S.C. 154(b) by 0 days.

(21) Appl. No.: 18/408,798

(22) Filed: Jan. 10, 2024

(65) Prior Publication Data
US 2025/0088565 A1    Mar. 13, 2025

(30) Foreign Application Priority Data
Sep. 8, 2023 (TW) ................................ 112134236

(51) Int. Cl.
*H04L 67/51* (2022.01)
*H04L 67/60* (2022.01)

(52) U.S. Cl.
CPC .............. *H04L 67/51* (2022.05); *H04L 67/60* (2022.05)

(58) Field of Classification Search
CPC ................................ H04L 67/60; H04L 67/51
USPC .......................................................... 709/223
See application file for complete search history.

(56) References Cited

U.S. PATENT DOCUMENTS 10,783,722 B2 * 9/2020 Madaan ............... G06Q 20/327
2021/0166214 A1 6/2021 Soundararajan

FOREIGN PATENT DOCUMENTS

| CN | 107392586 A | 11/2017 |
| CN | 114049112 A | 2/2022 |
| TW | M639750 U | 4/2023 |

* cited by examiner

*Primary Examiner* — Zi Ye
(74) *Attorney, Agent, or Firm* — Muncy, Geissler, Olds & Lowe, P.C.

(57) ABSTRACT

A service providing system includes a service-end device and a user-end device. The service-end device is used for providing at least one service identification information, and sending at least one activation signal within a preset range. The user-end device installs at least one service application program. When the user-end device appears in the preset range, it performs following procedures: receiving the at least one activation signal, and obtaining the service identification information provided by the service-end device according to the at least one activation signal; determining whether the service application program matches the service identification information or not; when determining that the service application program matches the service identification information, triggering the matched service application program; and establishing a two-way connection to the service-end device through the service application program.

20 Claims, 6 Drawing Sheets

SERVICE PROVIDING SYSTEM AND METHOD, NON-TRANSITORY, COMPUTER-READABLE STORAGE MEDIUM

CROSS REFERENCE TO RELATED APPLICATIONS

This Non-provisional application claims priority under 35 U.S.C. § 119 (a) on Patent Application No(s). 112134236 filed in Taiwan, Republic of China on Sep. 8, 2023, the entire contents of which are hereby incorporated by reference.

BACKGROUND

Technology Field

The present disclosure relates to a system and a method, and in particular, to a service providing system and method, a recording medium and an electronic pad that can automatically establish a two-way connection.

Description of Related Art

In recent years, based on the convenience and confidentiality of two-dimensional barcodes (i.e., QR codes) and the ability thereof to carry a relatively large amount of information, the QR codes are frequently used in various commercial applications, especially in high-tech industries, storage and transportation industries, wholesale and retail industries, and other industries. In many areas, QR codes have become a fast and convenient way to exchange information in life due to their easy generation and reading characteristics. For example, many businesses currently provide QR barcodes to customers in their service locations (e.g. restaurants). Customers can use their mobile devices (e.g. mobile phones) to scan the QR code and decode it to obtain specific information, such as the identification code and/or service items of the service location, and then to obtain the required services. For example, the customer can log in to a medical website to upload the personal traveling history, log in to a store website to obtain product information, log in to a restaurant website to download menu information or to order a meal, or the likes.

However, the current practice is that when a customer enters a service location, he/she needs to take out his/her mobile device and operates the mobile device to scan the provided QR code in order to obtain further services from the service location. Therefore, if the customer visits multiple service locations in a row, he/she must repeat the above actions multiple times to scan the QR codes of these locations. This is quite inconvenient. In addition, if the customer visits one service location repeatedly, he/she may still have to perform the above-mentioned actions again to scan the QR code every time, which is time wasting and inconvenient.

In another practice, when a customer enters a service location and wants to use the provided services, the customer's mobile device must first download the specific App. Afterwards, in order to use this specific App, the customer must first operate the mobile device to find and execute the specific App, click on the member account, and input the password, and then the member's account or barcode (e.g. QR code) will be displayed. After that, the customer can provide the displayed barcode to the store clerk for scanning so as to finish the following operations for member, such as accumulating consumption points or performing other actions (e.g. payment). These process including finding and executing the App, clicking on the App, inputting the password and then providing the member information to the store clerk are quite complicated and inconvenient. Sometimes, if the customer takes time to find the specific App, the other customers in the purchasing line may feel impatient and uncomfortable.

SUMMARY

An objective of this disclosure is to provide a service providing system and method and a recording medium that can automatically establish a two-way connection between the user end and the service end so as to facilitate the interaction therebetween, so that the required service or information can be quickly selected or provided, thereby improving the operation convenience.

In addition, this disclosure also provide an electronic pad that allows the service end to initiatively provide QR code information, while the user end can passively receive the QR code, so that the user end can obtain the required QR code to get further service without performing complicated operations.

To achieve the above objective, a service providing system of this disclosure includes a service-end device and a user-end device. The service-end device is used for providing at least one service identification information and sending at least one activation signal within a preset range. The user-end device installs at least one service application program. When the user-end device appears in the preset range, the user-end device performs following procedures: receiving the at least one activation signal and obtaining the service identification information provided by the service-end device according to the at least one activation signal; determining whether the service application program is matched based on the service identification information; when determining the service application program is matched with the service identification information, triggering the matched service application program; and establishing a two-way connection to the service-end device through the service application program.

In one embodiment, the user-end device passively receives the service identification information.

In one embodiment, before the procedure of triggering the matched service application program, the user-end device further performs a procedure: when determining the service application program is matched with the service identification information, waiting for a trigger instruction. The procedure of triggering the matched service application program is performed after the user-end device receives the trigger instruction.

In one embodiment, when determining the service application program is matched with the service identification information, the user-end device enters a lock-on status, and the user-end device starts to receive the trigger instruction after a user performs a unlock action to the user-end device.

In one embodiment, the trigger instruction is to perform a user authentication, or to input a command and/or information by a user.

In one embodiment, the service application program sets security authentication information when the service application program first interacts with the service-end device.

In one embodiment, after the procedure of establishing the two-way connection to the service-end device through the service application program, the user-end device further performs a procedure of: operating the service application program to select at least one service item provided by the service-end device; or operating the service application program to provide at least one specific information to the service-end device; or operating the service application program to provide at least one control command to the service-end device.

In one embodiment, the service item includes a meal ordering service, a shopping list service, an online shopping service, a payment system, an access control system, an elevator system, or a combination thereof.

In one embodiment, the specific information includes identity information, mobile payment information, e-invoice account information, preset configuration and information of the user-end device, or a combination thereof.

In one embodiment, the service-end device includes an electronic pad, a processing chip, a computer or a server, and the electronic pad, the processing chip, the computer or the server transmits the service identification information by wireless signal transmission.

In one embodiment, the electronic pad generates the service identification information based on a paper document.

In one embodiment, the processing chip, the computer or the server generate the service identification information based on digital data.

In one embodiment, the two-way connection to the service-end device is established through the service application program based on preset configuration and information of the user-end device.

To achieve the above objective, this disclosure also provides a service providing method applied with a service providing system. The service providing system includes a service-end device and a user-end device. The service-end device provides at least one service identification information, and the user-end device installs at least one service application program. The service providing method includes the following steps of: the service-end device outputting at least one activation signal; when a distance between the user-end device and the service-end device is within a preset range, the user-end device receiving the at least one activation signal and obtaining the service identification information provided by the service-end device according to the at least one activation signal; the user-end device determining whether the service application program is matched based on the service identification information; when determining the service application program is matched with the service identification information, the user-end device triggering the matched service application program; and the user-end device establishing a two-way connection to the service-end device through the service application program.

In one embodiment, before the user-end device triggers the matched service application program, the service providing method further includes a step of: when determining the service application program is matched with the service identification information, the user-end device waiting for a trigger instruction; wherein the user-end device triggers the matched service application program after the user-end device receives the trigger instruction.

In one embodiment, when determining the service application program is matched with the service identification information, the user-end device enters a lock-on status, and the user-end device starts to receive the trigger instruction after a user performs a unlock action to the user-end device.

In one embodiment, the trigger instruction is to perform a user authentication, or to input a command and/or information by a user.

In one embodiment, the service application program sets security authentication information when the service application program first interacts with the service-end device.

In one embodiment, after the user-end device establishes the two-way connection to the service-end device through the service application program, the service providing method further includes: operating the service application program of the user-end device to select at least one service item provided by the service-end device; or operating the service application program of the user-end device to provide at least one specific information to the service-end device; or operating the service application program of the user-end device to provide at least one control command to the service-end device.

In one embodiment, the service item includes a meal ordering service, a shopping list service, an online shopping service, a payment system, an access control system, an elevator system, or a combination thereof.

In one embodiment, the specific information includes identity information, mobile payment information, e-invoice account information, preset configuration and information of the user-end device, or a combination thereof.

In one embodiment, the service-end device transmits the service identification information by wireless signal transmission.

In one embodiment, the two-way connection to the service-end device of the service providing system is established through the service application program based on preset configuration and information of the user-end device.

To achieve the above objective, this disclosure further provides a recording medium storing application software that, when executed, performs the above-mentioned service providing method.

To achieve the above objective, an electronic pad of this disclosure includes a pad body, an inputting unit, a processing unit and a wireless signal outputting unit. The pad body is configured to carry a QR code document, which at least contains a QR code. The inputting unit is configured to retrieve the QR code from the QR code document. The processing unit is configured to generate a QR code information corresponding to the retrieved QR code, wherein the QR code information includes a service identification information. The wireless signal outputting unit is configured to transmit the QR code information by wireless signal transmission.

In one embodiment, the pad body includes a front board and a rear board. When the front board and the rear board are assembled with each other, an accommodation space is formed between the front board and the rear board. The QR code document is accommodated in the accommodation space, and the QR code of the QR code document faces toward the front board.

In one embodiment, the inputting unit includes a scanning module, a camera module, a wired signal receiving module, or a wireless signal receiving module, or a combination thereof.

In one embodiment, the electronic pad further includes a control button. When the control button is triggered, the inputting unit is activated to retrieve the QR code on the QR code document.

As mentioned above, in the service providing system and method and the recording medium of this disclosure, the service-end device can provide at least one service identification information, and the user-end device installs at least one service application program. The service-end device outputs at least one activation signal. When a distance between the user-end device and the service-end device is within a preset range, the user-end device receives the at least one activation signal and obtains the service identification information provided by the service-end device according to the at least one activation signal. The user-end device determines whether the service application program is matched based on the service identification information. When determining the service application program is matched with the service identification information, the user-end device triggers the matched service application program, and the user-end device establishes a two-way connection to the service-end device through the service application program. Based on the above-mentioned service providing mechanism, the two-way connection between the user-end device and the service-end device can be automatically established, so that the user-end device and the service-end device can further generate interactions therebetween, thereby quickly selecting or providing the required service or information. This mechanism can improve the operation convenience.

In addition, in the electronic pad of this disclosure, the inputting unit is configured to retrieve the QR code from the QR code document, the processing unit is configured to generate a QR code information corresponding to the retrieved QR code, and the wireless signal outputting unit is configured to transmit the QR code information by wireless signal transmission. In other words, the electronic pad can initiatively output the QR code information by wireless signal transmission, while the user-end device can obtain the QR code in a passive manner. Therefore, the user-end device can obtain the required QR code to get further service without performing complicated operations.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
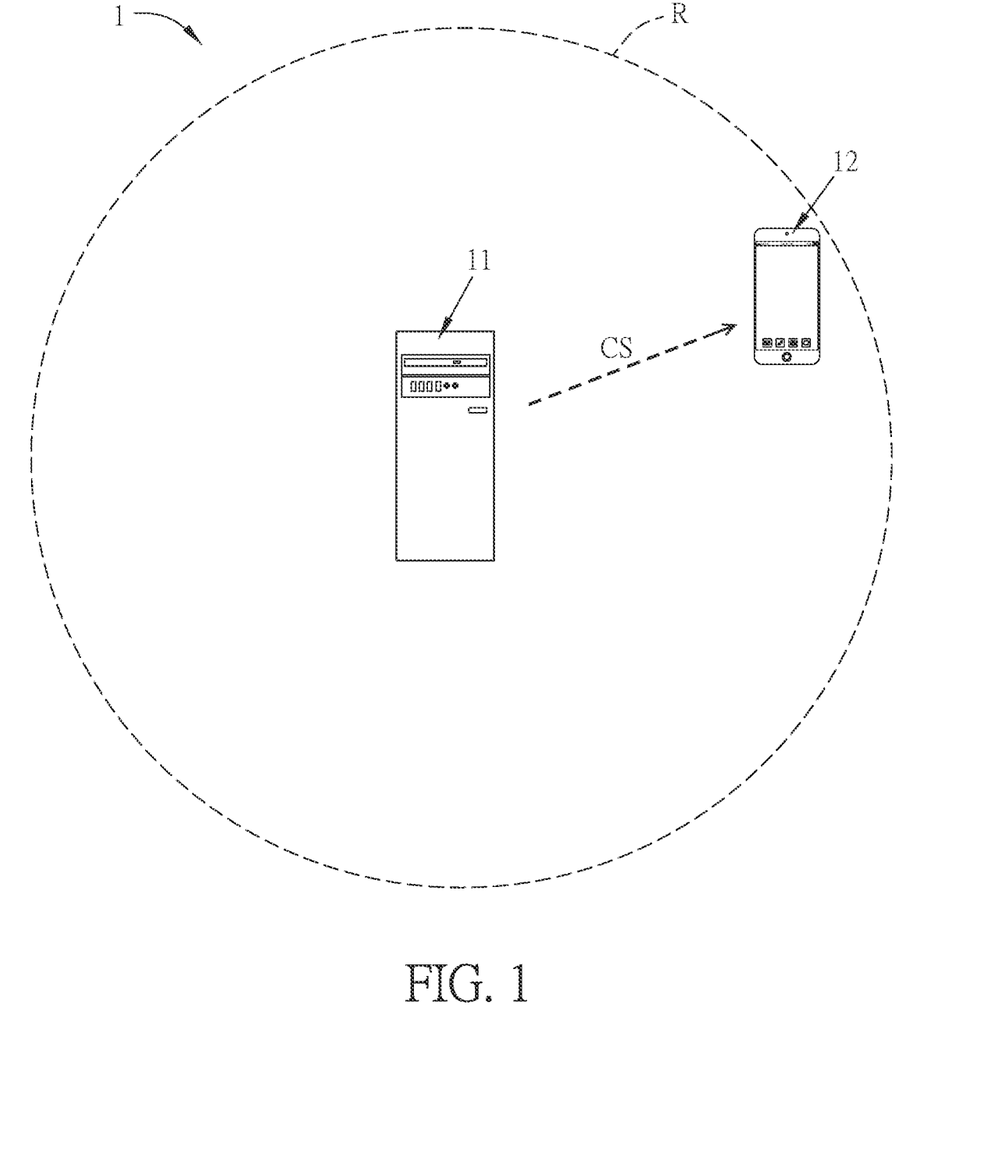
FIG. 1 is a schematic diagram showing a service providing system according to an embodiment of this disclosure.
Figure 2:
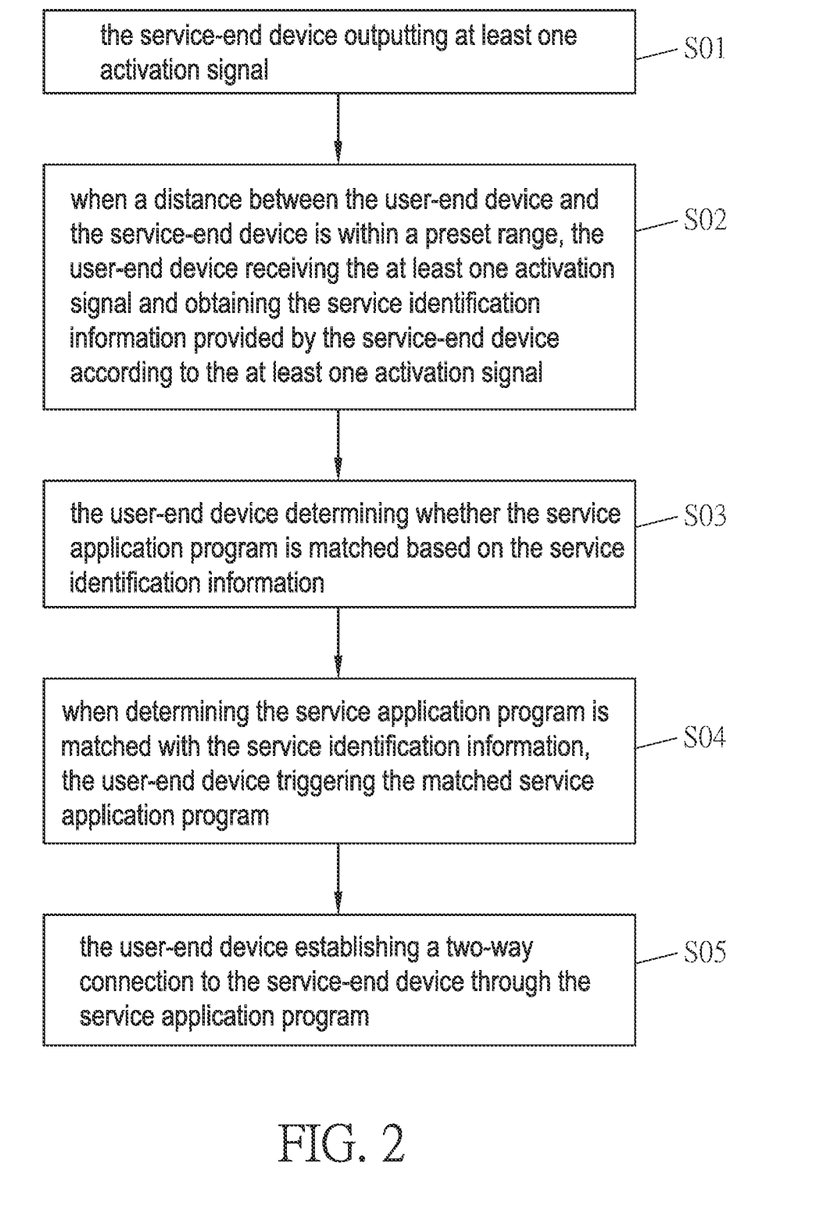
FIG. 2 is a flow chart of a service providing method according to an embodiment of this disclosure.
Figure 3A:
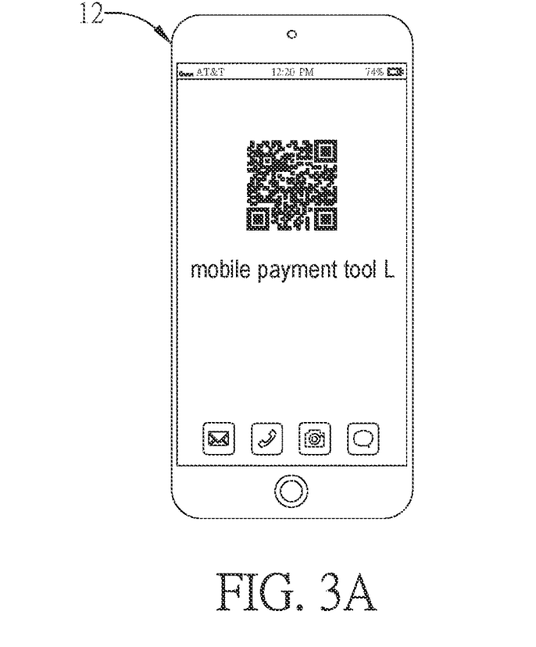
FIGS. 3A and 3B are schematic diagrams showing the displayed screens of the user-end device in different aspects while performing the service providing method of FIG. 2.
Figure 3B:
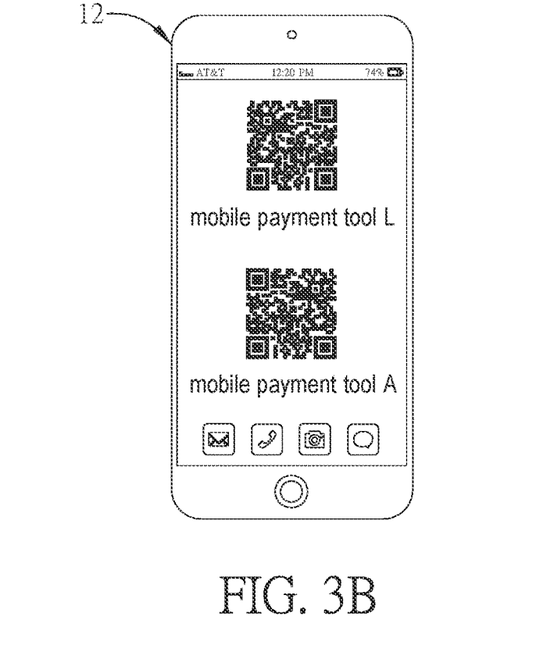

FIG. 1 is a schematic diagram showing a service providing system according to an embodiment of this disclosure, FIG. 2 is a flow chart of a service providing method according to an embodiment of this disclosure, and FIGS. 3A and 3B are schematic diagrams showing the displayed screens of the user-end device in different aspects while performing the service providing method of FIG. 2;

With reference to FIG. 1, a service providing system 1 of this embodiment includes a service-end device 11 and at least one user-end device 12. The service-end device 11 is used for providing at least one service identification information and sending at least one activation signal CS within a preset range R. The user-end device 12 installs one or more service application programs. When the user-end device 12 appears in the preset range R, the user-end device 12 at least performs following procedures: receiving the at least one activation signal CS and obtaining the service identification information provided by the service-end device 11 according to the at least one activation signal CS; determining whether the service application program is matched based on the service identification information; when determining the service application program is matched with the service identification information, triggering (activating and executing) the matched service application program; and establishing a two-way connection to the service-end device 11 through the service application program so as to be ready for performing the following action or interaction.

In addition, the two-way connection between the user-end device 12 and the service-end device 11 can be established through the service application program based on preset configuration and information of the user-end device 12. In this embodiment, the preset configuration and information of the user-end device 12 can include, for example, the personal information, customized information, authentication information, or the likes.

The service application program can include, for example but not limited to, any specific application programs (e.g. video program or communication program), specific Apps (e.g. any payment Apps (such as PayPal, Line Pay, Apple Pay, etc.), access control Apps, elevator control Apps, etc.), or general applications (e.g. any kinds of browsers such as Microsoft IE, Microsoft Edge, Google Chrome, Firefox, etc.).

The service identification information outputted by the service-end device can be, for example, the brand and/or model of the service-end device, store information and/or store location, etc.

The service application program can set the security authentication information based on the service identification information of the service-end device during installation.

In one embodiment, the service-end device 11 can be, for example but not limited to, a local or remote electronic device of a store (or shop), wherein the electronic device can be, for example but not limited to, an electronic pad, a processing chip, a computer or a server, and can output service identification information by wireless signal transmission. In this case, the aforementioned electronic pad can generate service identification information based on a paper document, and the processing chip, computer or server can generate service identification information based on digital data, such as factory settings, service provider information, location information, etc. In one embodiment, the electronic pad and/or processing chip may be integrated into, for example, a store's POS machine, or may be an independent device. In one embodiment, the service identification information provided by the service-end device 11 can include, for example but not limited to, identification information of the service application program, or information used to identify any of other services. In one embodiment, the service identification information can be, for example but not limited to, QR code information, or a URL linking to a web page or an order list.

In one embodiment, the user-end device 12 may be, for example but not limited to, a mobile phone or a tablet computer. In one embodiment, the user-end device 12 can install different service application programs of multiple stores, and the service application program of each store has unique service identification information. In one embodiment, the service-end device 11 can initiatively output the service identification information, and the user-end device 12 passively receives the service identification information. For convenience of explanation, the service-end device 11 in the following embodiments all takes a mobile phone as an example, and the service application program takes an App installed on the mobile phone as an example.

In one embodiment, before the user-end device 12 triggers the matched service application program, the user-end device 12 may further perform a procedure: when determining the service application program is matched with the service identification information, the user-end device 12 waiting for a trigger instruction; wherein the user-end device 12 triggers the matched service application program after the user-end device 12 receives the trigger instruction. Specifically, for example, when the user-end device 12 determines that an App matches the service identification information, the user-end device 12 first enters a lock-on status. At this time, it is not allowed to establish the two-way connection to the service-end device 11 through the App. Afterwards, only when the user performs an unlock action to the user-end device 12 and the user-end device 12 receives the trigger instruction, the user-end device 12 will be allowed to trigger the App. Then, the user can operate the App to perform subsequent actions. In this case, the unlock procedure can be any suitable unlock action. For example, according to the convenient settings, the user can click the "Yes" function block (input command). In another case, according to the security setting, the unlock procedure (unlock action) is to perform a user authentication, for example, through fingerprint recognition, face recognition, entering a password (input information), or any combination of the above actions to perform an unlock action. This disclosure is not limited thereto. To be noted, if the App of the user-end device 12 is preset to automatically unlock, the procedure of establishing a two-way connection can be automatically triggered.

Moreover, With considering security setting, the user-end device 12 can filter the service identification information sent by the service-end device 11 (sender) based on, for example, device name, encryption information, encryption key, or etc., to determine whether the service identification information is matched or not. This step can block the service identification information that is not outputted by the service-end device 11 so as to block the possible malicious or fraudulent information.

With considering both security and convenience settings, the service application program can set the security authentication information when interacting with the service-end device 11 for the first time. Thereafter, when the service application program interacts with the service-end device 11 again, the two-way connection can be directly established for quick follow-up actions.

In one embodiment, after the user-end device 12 establishes a two-way connection to the service-end device 11 through the service application program, the user-end device 12 can further perform a procedure of: selecting at least one service item provided by the service-end device 11 through the service application program. Specifically, in one embodiment, the service application program may be, for example but not limited to, a shopping or meal ordering service application (App), and the selected service item provided by the service-end device 11 may be, for example, meal ordering service, a shopping list service, an online shopping service, a payment system, an access control system, an elevator system, or a combination thereof.

In one embodiment, after the user-end device 12 establishes the two-way connection with the service-end device 11 through the service application program, the user-end device 12 can further perform a procedure of: providing at least one specific information to the service-end device 11 through the service application program. Specifically, in one embodiment, the at least one specific information provided by the user-end device 12 may include, for example but not limited to, identity information (for user identity verification), mobile payment information (for fee payment), e-invoice account information (for receiving e-invoices), preset configuration and information of the user-end device (for providing required customized information corresponding to different service application programs or service-end devices), or any combination thereof. In one embodiment, the specific information may include QR code information.

As shown in FIG. 2, a service providing method of this embodiment is applied with the service providing system 1 as shown in FIG. 1. In the service providing system 1, the service-end device 11 provides at least one service identification information, and the user-end device 12 installs at least one service application program. The service providing method includes the following steps of: the service-end device outputting at least one activation signal CS (step S01); when a distance between the user-end device and the service-end device is within a preset range, the user-end device receiving the at least one activation signal and obtaining the service identification information provided by the service-end device according to the at least one activation signal (step S02); the user-end device determining whether the service application program is matched based on the service identification information (step S03); when determining the service application program is matched with the service identification information, the user-end device triggering the matched service application program (step S04); and the user-end device establishing a two-way connection to the service-end device through the service application program (step S05).

In one embodiment, before the user-end device triggers the matched service application program, the service providing method can further include a step of: when determining the service application program is matched with the service identification information, the user-end device waiting for a trigger instruction; wherein the user-end device triggers the matched service application program after the user-end device receives the trigger instruction. In one embodiment, after the user-end device establishes the two-way connection to the service-end device through the service application program, the service providing method can further include: operating the service application program of the user-end device to select at least one service item provided by the service-end device; or operating the service application program of the user-end device to provide at least one specific information to the service-end device; or operating the service application program of the user-end device to provide at least one control command to the service-end device.

The above-mentioned service providing system 1 and service providing method will be further described with reference to the following examples.

With reference to FIGS. 1 and 2, in one embodiment, the service-end device 11 may be an electronic pad, a processing chip, a computer or a server installed in the store or shop, and has a wireless signal transmission function. The wireless signal transmission may include, for example but not limited to, RF communication, Bluetooth communication, near-field wireless communication, infrared communication or telecommunication. In addition, the service-end device 11 can provide at least one service identification information, and the preset range R of the service-end device 11 can be set to the entrance of the store, the area around the checkout counter (e.g. within 5 meters around the checkout counter), or the internal space of the store or shop, etc. The disclosure is not limited thereto. In another case, the service-end device 11 of the service providing system 1 can output the wireless signals through a relay device, and this disclosure is not limited thereto.

For example, regarding the currently existing service applications (Apps) of various stores or shops, such as 7-11, FamilyMart, Walmart, Carrefour, Homebox, McDonald's, gas stations, etc., the members may proceed the following operation guidelines. First, the member must operate the personal mobile phone to download a specific App of the store or shop. For purchasing procedure, the member must first activate the mobile phone to find the specific App and execute it. After clicking the member account and entering the password, the member's QR code will be displayed on the mobile phone. Then, the member can provide the displayed member's QR code to the store clerk for scanning to accumulate member points or perform other actions (e.g. payment).

In an application embodiment of this disclosure, regarding the specific store such as, for example but not limited to, the above-mentioned 7-11, FamilyMart, Walmart, Carrefour, Homebox, McDonald's, gas stations, etc., the service-end device 11 can be installed at the checkout counter area or the seat area, wherein the service-end device 11 can includes an electronic pad, a processing chip, a computer or a server, or a combination thereof, and it can output at least one activation signal CS (step S01). When the user enters the specific area of the store, so that the user-end device 12 (mobile phone) appears within the preset range R, the activation signal CS outputted by the service-end device 11 can be received by the user-end device 12. At this time, the user-end device 12 will obtain the service identification information provided by the service-end device 11 based on the activation signal CS (step S02). Then, the user-end device 12 will automatically determine whether a specific App matching the service identification information has been downloaded and registered (step S03). If determining the specific App matches the service identification information, the user-end device 12 will display a query page to decide whether to open and execute the specific App or not. When the user click "Agree" button, it will be triggered to open this specific App (step S04). Accordingly, the user-end device 12 can establish a two-way connection with the service-end device 11 through the specific App (step S05). That is, the user-end device 12 can connect to the service-end device 11 through the specific App. At this time, the user can select at least one service provided by the store or shop through the specific App, such as a meal ordering service, a shopping list service, an online shopping service, a payment system, an access control system, an elevator system, or a combination thereof. In another case, the user-end device 12 can automatically provide specific information to the service-end device 11 (store or shop) through the specific App. The specific information can be, for example, identity information (for user identity verification), mobile payment information (for purchasing), e-invoice account information (for receiving e-invoices), preset configuration and information of the user-end device (for providing required customized information to different service application programs or service-end devices), or a combination thereof. In this embodiment, the user does not need to perform the steps of finding the merchant's specific App on the user-end device 12 and entering a password to obtain the corresponding QR code for identity verification. Moreover, the user can use the specific App to review the shopping details, to order meal online, to shop online, to pay fees, or to provide e-invoice account, or any combination thereof.

In another application embodiment, after the user-end device 12 establishes a two-way connection with the service-end device 11 through the service application program (step S05), the user-end device 12 may also provide a control command to the service-end device 11 through the service application program. For example, taking a hospital's digital companion card (QR code) as an example, a service-end device 11 (e.g. an electronic pad or processing chip) can be installed in the elevator to provide service identification information. When the user (along with personal mobile phone) enters the elevator, the mobile phone has downloaded a specific App for the hospital's digital companion card, and the specific App matches the service identification information, the mobile phone can automatically display the QR code of the digital companion card and ask whether this QR code can be sent. After the user confirms that it can be sent for identity verification, the user-end device 12 and the service-end device 11 in the elevator can establish a two-way connection, and the user can provide the control command of visiting a specific floor to the elevator through the specific App. Accordingly, the user can easily control the elevator to move to the specific floor without putting the QR code of the digital companion card toward the elevator's scanner for scanning. That is, the user does not need to press the elevator button. This can not only improve the operation convenience, but also avoid the risk of infection while the visitors touch the elevator buttons.

The following example relates to the case of payment. Referring to FIGS. 1 and 2 again, in this embodiment, the service-end device 11 can support multiple mobile payment services and can provide corresponding service identification information. These mobile payment services can be available and supported mobile payment services that have contracted with the store or shop of the service-end device 11, such as, for example but not limited to, Line Pay, Apple Pay, JKOPay, Alipay, PX Pay, mobile payments of various convenience supermarkets, etc. This disclosure is not limited thereto. In addition, in the service providing system 1, the service-end device 11 can send wireless signals through a relay device, such as, for example but not limited to, an electronic pad or a processing chip.

First, in step S01, the merchant's service-end device 11 can output an activation signal CS within the preset range R. In this embodiment, the activation signal CS can be sent as a wireless signal, and the range of the signal can be defined as the preset range R. The activation signal CS in this embodiment may carry information about multiple mobile payment services provided or supported by the service-end device 11. In this case, the information of these mobile payment services may, for example, include mobile payment tools A to I, and the service identification information provided by the service-end device 11 may, for example, include the identification information of mobile payment tools A to I.

Next, in step S02, when the user-end device 12 (e.g. mobile phone) appears within the preset range R of the service-end device 11, the user-end device 12 can receive the activation signal CS and obtain the service identification information provided by the service-end device 11 based on the activation signal CS. Herein, the user-end device 12 can obtain the identification information of the mobile payment tools A to I provided by the service-end device 11.

Then, in step S03, the user-end device 12 determines that whether the installed service application programs of the user-end device 12 matches the service application program according to the service identification information. In this embodiment, the user-end device 12 can analyze the obtained identification information of these mobile payment tools A to I, and determine whether there is any service application program (mobile payment App) that is downloaded and matches the identification information of any of these mobile payment tools A to I.

Afterwards, in step S04, when the installed service application program (mobile payment App) of the user-end device 12 matches one of the identification information of these mobile payment tools A to I, the user-end device 12 triggers the matched service application program (mobile payment App).

Finally, in step S05, the user-end device 12 establishes a two-way connection with the service-end device 11 through the service application program (mobile payment App).

For example, the App of mobile payment tool L is installed on the user-end device 12. Therefore, after the determining step, the user-end device 12 determines that the installed service application program (mobile payment APP) matches the mobile payment tool L, and the user-end device 12 can activate the mobile payment App to generate a payment QR code corresponding to the mobile payment tool L (as shown in FIG. 3A), which can be used to pay the purchase or bill. It should be noted that if there is no installed mobile payment App matching the available mobile payment tools (for example, only the App of mobile payment tool K is installed on the user-end device 12), it means that the user-end device 12 cannot use the mobile payment service provided by the service providing system 1.

In addition, the step S04 can further include some additional actions, which will be described below. In one embodiment, when the user-end device 12 determines that the installed mobile payment APP matches the identification information of the mobile payment tool L, the user-end device 12 first waits for a trigger instruction, and after the user agrees and executes an unlock procedure and the user-end device 12 receives the trigger instruction, the user-end device 12 can trigger the mobile payment App to generate a payment QR code corresponding to the matched mobile payment APP. The unlock procedure can be any suitable unlock action, such as clicking the "Yes" function block, or performing a user authentication such as fingerprint recognition, face recognition, password, or any combination thereof. This disclosure is not limited thereto.

In another embodiment, the user-end device 12 may be installed with a plurality of mobile payment Apps, and each mobile payment App has a usage frequency. When two or more of these mobile payment Apps match the identification information of two or more of these mobile payment tools A to I, one of the two or more matched mobile payment Apps will be selected to be activated based on the usage frequencies of the matched mobile payment Apps to generate the payment QR code corresponding to the selected mobile payment tool. For example, the user-end device 12 may be installed with mobile payment Apps of mobile payment tools A, L and K, and each of these three mobile payment Apps has a usage frequency. In this case, the Apps of mobile payment tools A and L can match the mobile payment service of the service-end device 11, but the App of the mobile payment tool K does not match the mobile payment service of the service-end device 11. If the usage frequency of the App of the mobile payment tool L is greater than the usage frequency of the App of the mobile payment tool A, it indicates that the consumer prefers to use the mobile payment tool L. Therefore, the user-end device 12 will automatically select the mobile payment tool L to perform the payment action, so the user-end device 12 will generate a payment QR code corresponding to the mobile payment tool L.

In another embodiment, the user-end device 12 may be installed with a plurality of mobile payment Apps. When two or more of these mobile payment Apps match two or more of these mobile payment services, the matched mobile payment Apps may be activated simultaneously so as to generate multiple payment QR codes corresponding to matched mobile payment services. For example, the user-end device 12 may be installed with Apps of mobile payment tools A, L and K. In this case, the Apps of mobile payment tools A and L may match the mobile payment services of the service-end device 11, but the App of the mobile payment tool K does not match the mobile payment service of the service-end device 11. Therefore, the user-end device 12 can activate the Apps of mobile payment tools A and L at the same time to generate two payment QR codes corresponding to mobile payment tools A and L (as shown in FIG. 3B), and then the consumer can clicks one of the payment QR codes corresponding to the desired mobile payment service to pay the purchase or bill.

In addition, this disclosure also provides a recording medium storing an application software, and the application software can be loaded and executed by an electronic device so as to performing the aforementioned service providing method. In one embodiment, the recording medium may be a non-transitory computer readable storage medium, which may include at least one of memory, memory chip, memory card, optical disc, video tape, or computer tape, or any combination thereof. The memory may include read-only memory (ROM), flash memory, programmable gate array, field-programmable gate array (FPGA), other forms of memory, or any combination thereof. In one embodiment, the recording medium can be the built-in memory of a mobile phone, computer or server. In another embodiment, the recording medium can be a cloud memory in a cloud device, so the application software can be stored in the cloud device, and the electronic device can download the application software from the cloud device and then execute it.

Figure 4A:
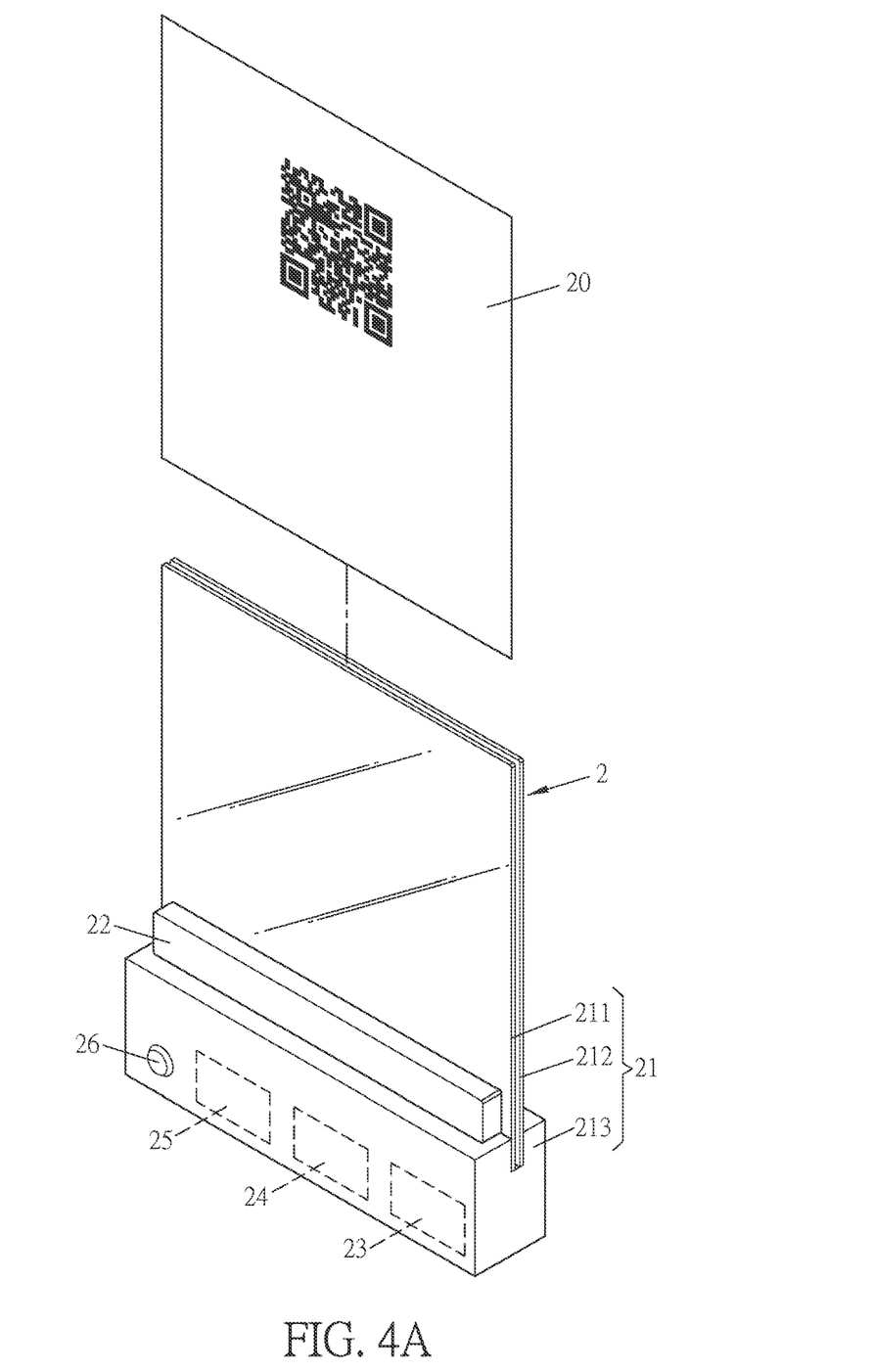
FIG. 4A is a schematic diagram showing an electronic pad according to an embodiment of this disclosure.
Figure 4B:
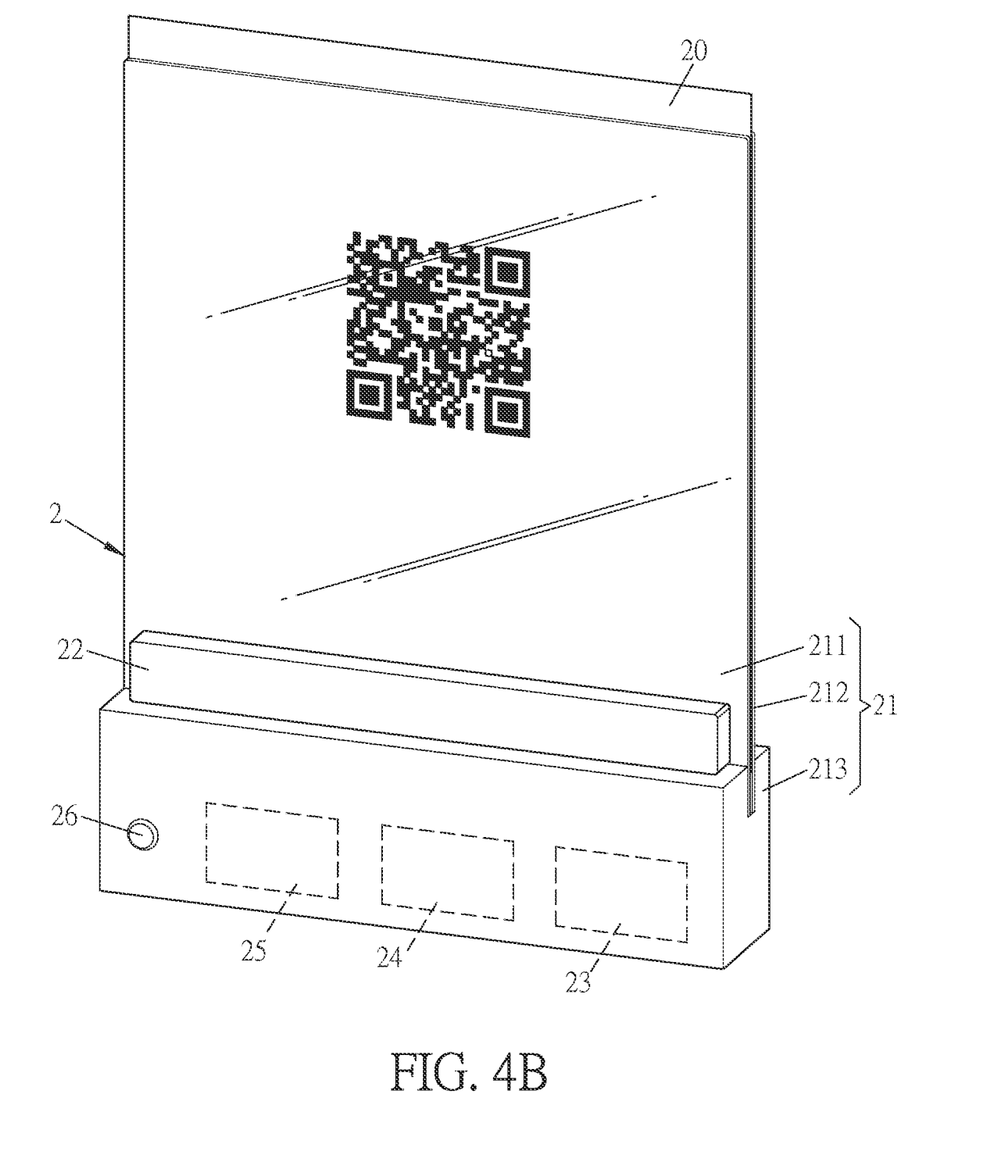
FIG. 4B is a schematic diagram showing the electronic pad of FIG. 4A, wherein a QR code document is carried by the electronic pad.

FIG. 4A is a schematic diagram showing an electronic pad according to an embodiment of this disclosure, and FIG. 4B is a schematic diagram showing the electronic pad of FIG. 4A, wherein a QR code document is carried by the electronic pad.

With reference to FIG. 4A, the electronic pad 2 of this embodiment includes a pad body 21, an inputting unit 22, a processing unit 23, and a wireless signal outputting unit 25. In addition, the electronic pad 2 can further include a memory unit 24 and a control button 26.

The pad body 21 is configured to carry a QR code document 20, which at least contains a QR code. In this embodiment, the QR code document 20 can be, for example, a paper document. The pad body 21 may include a front board 211, a rear board 212, and a base 213. The front board 211 and the rear board 212 are assembled on the base 213.

After the front board 211 and the rear board 212 are assembled, an accommodation space can be formed between the front board 211 and the rear board 212, and the QR code document 20 can be accommodated in the accommodation space. The QR code on the QR code document 20 faces the front board 211. In one embodiment, the front board 211 and the rear board 212 may be, for example, transparent acrylic boards, but this disclosure is not limited thereto. In one embodiment, the front board 211 may be a transparent acrylic board, and the rear board 212 may not be a transparent panel. In one embodiment, the size of the front board 211 and the rear board 212 can roughly match or be slightly larger than the A4 paper size, and the QR code document 20 can be an A4 paper. To be noted, this disclosure is not limited thereto.

The inputting unit 22 is configured to retrieve the QR code from the QR code document 20. In this embodiment, the inputting unit 22 can be a scan module, which is arranged at one side of the front board 211 and is configured to scan the QR code printed on the QR code document 20 that is disposed in the accommodation space. In one embodiment, when the control button 26 provided on the base 213 is triggered (e.g. when a store clerk places the QR code document 20 in the accommodation space and actively presses the control button 26), the inputting unit 22 is activated to start scanning the QR code document 20, thereby retrieving the QR code from the QR code document 20. It should be noted that the inputting unit 22 is not limited to a scan module. In different embodiments, the inputting unit 22 may be a camera module that can capture the image of the QR code on the QR code document 20 so as to obtain the QR code. In one embodiment, the inputting unit 22 can be a wired signal receiving module or a wireless signal receiving module, which can receive a QR code obtained by an external camera. In one embodiment, the inputting unit 22 can be any combination of a scan module, a camera module, a wired signal receiving module, and a wireless signal receiving module. The implementation of the inputting unit 22 is not limited in this disclosure.

Figure 5:
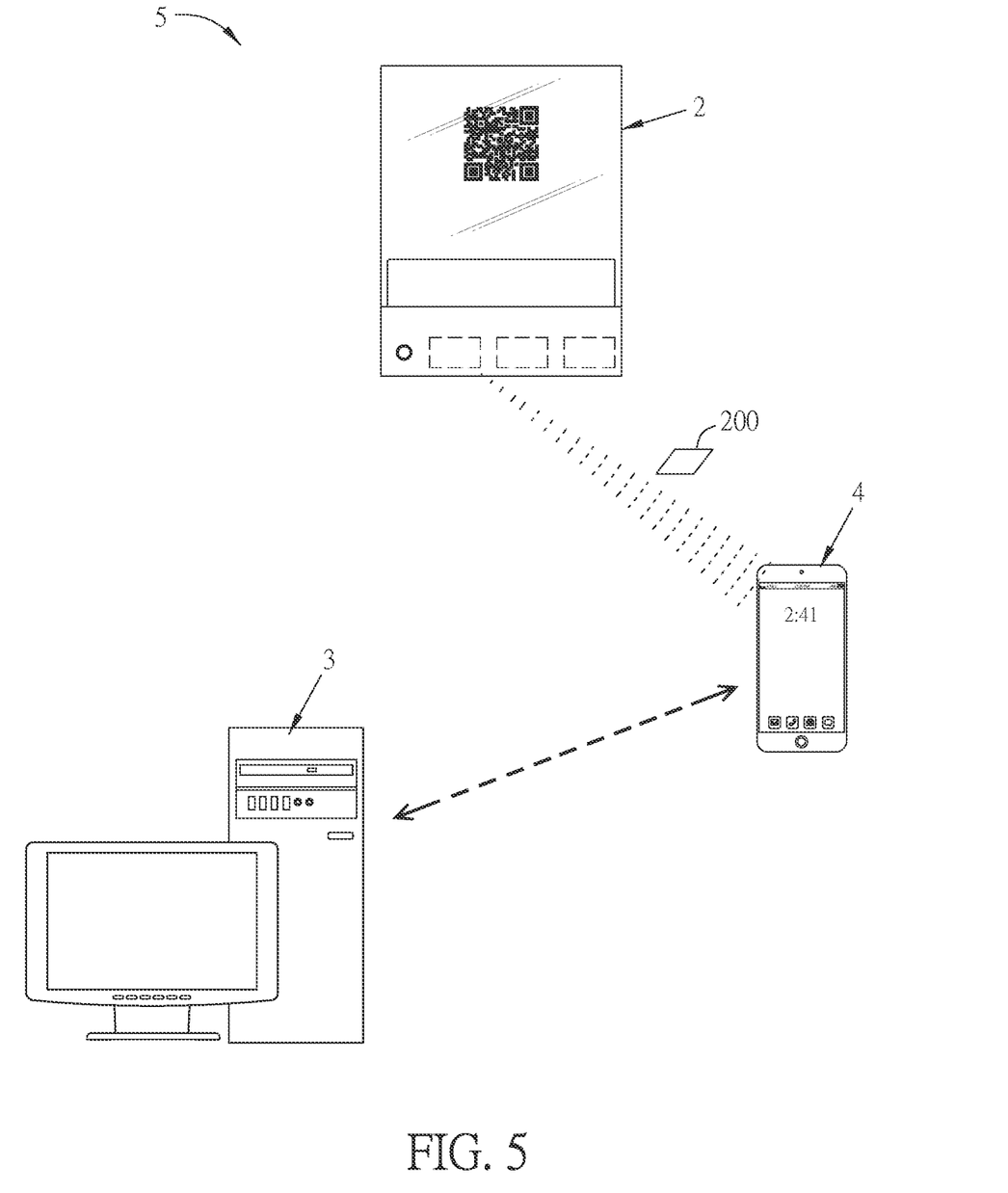
FIG. 5 is a schematic diagram showing a service providing system according to another embodiment of this disclosure.

The processing unit 23 is disposed inside the base 213 and is configured to generate a QR code information 200 corresponding to the retrieved QR code (as shown in FIG. 5). In this embodiment, the QR code information 200 at least includes the above-mentioned service identification information. Herein, the processing unit 23 can be a CPU, a micro processer, or any suitable processing IC, and this disclosure is not limited.

The memory unit 24 is disposed inside the base 213 and is configured to record/store the QR code information 200. In this embodiment, the memory unit 24 can be any suitable memory element, such as a flash memory, a register, etc., and this disclosure is not limited.

The wireless signal outputting unit 25 is disposed inside the base 213 and is configured to outputting the QR code information 200 by wireless signal transmission. In this embodiment, the wireless signal outputting unit 25 may include an antenna element, and the above-mentioned wireless signal transmission may be implemented by, for example but not limited to, RF communication, Bluetooth communication, near-field wireless communication, infrared communication or telecommunication. This disclosure is not limited thereto. Specifically, the processing unit 23 can control to retrieve the QR code information 200 stored in the memory unit 24, and then output the QR code information 200 through the wireless signal outputting unit 25 by wireless signal transmission.

To be understood, in an application embodiment, the electronic pad 2 can be an independent component installed in a store, or it can be integrated with the store's POS machine, computer or server to form a single component. This disclosure is not limited thereto.

The service providing system and method will be further described with reference to FIG. 5, wherein FIG. 5 is a schematic diagram showing a service providing system according to another embodiment of this disclosure.

As shown in FIG. 5, a service providing system 5 includes a service-end device and at least one user-end device 4. In this embodiment, the service-end device includes an electronic pad 2 and a service-end host 3. The specific technical content of the electronic pad 2 can be referred to the above-mentioned embodiment with reference to FIGS. 4A and 4B, so the detailed description thereof will be omitted. The service-end host 3 can be, for example but not limited to, a computer or a server. In this embodiment, the service-end host 3 is a server.

In this embodiment, the service-end device (e.g. the electronic pad 2) is used to provide at least one service identification information, and the user-end device 4 can install at least one service application program. First, the service-end device (the electronic pad 2) can send out an activation signal (step S01). When the user-end device 4 appears within a preset range of the electronic pad 2, the user-end device 4 can receive the activation signal sent by the wireless signal outputting unit 25 of the electronic pad 2 so as to obtain the QR code information 200 provided by the electronic pad 2 based on the activation signal (step S02). Herein, the QR code information 200 includes the aforementioned service identification information. Afterwards, the user-end device 4 can determine whether the service application program is matched based on the QR code information 200 (service identification information) (step S03). When the user-end device 4 determines that the service application program matches the QR code information 200 (service identification information), the user-end device 4 triggers the matched service application program (step S04). Next, the user-end device 4 establishes a two-way connection with the service-end device (service-end host 3) through the triggered service application program (step S05). In this embodiment, the triggered service application program of the user-end device 4 can connect to the service webpage of the service-end host 3 via Internet or a local area network to obtain the services provided by the service webpage of the service-end host 3.

In one application example, the service providing system 5 and the service providing method of this embodiment can be applied to a restaurant. Please refer to FIGS. 4A, 4B and 5. First, the restaurant staff can use a QR code generator or software to generate a QR code that is relevant and unique to the restaurant, and then print the QR code on a paper (e.g. an A4 paper) to obtain the QR code document 20. This QR code document 20 may include the restaurant's service identification information (e.g. App identification information). Next, the restaurant staff places the QR code document 20 in the pad body 21. As mentioned above, the QR code document 20 can be an A4 paper, and the size of the pad body 21 and its accommodation space can be approximately A4 size to accommodate the QR code document 20. Then, the restaurant staff can press the control button 26 to activate the inputting unit 22 to capture the QR code printed on the QR code document 20. The inputting unit 22 may be a scan unit (e.g. including a photo sensor), which may capture the QR code on the QR code document 20 by optical scanning method. After capturing the QR code, the processing unit 23 of the electronic pad 2 will initiatively generate corresponding QR code information 200 based on the captured QR code, and the QR code information 200 can be recorded in the memory unit 24. In this embodiment, the restaurant staff can install the electronic pad 2 at any appropriate location in the restaurant space, such as at the entrance, the seat area, the checkout counter, or the likes.

When a customer enters the restaurant, the electronic pad 2 can initiatively conduct wireless signal communication with the customer's mobile phone (the user-end device 4) to determine that the customer has entered the restaurant space (i.e., the user-end device 4 appears within the preset range of the electronic pad 2). At this time, the wireless signal outputting unit 25 initiatively sends the QR code information 200 to the customer's mobile phone (the user-end device 4) by wireless signal transmission, so that the customer's mobile phone (the user-end device 4) can passively receive the QR code information 200. When the customer's mobile phone (the user-end device 4) receives the QR code information 200, the customer's mobile phone (the user-end device 4) will automatically determine whether there is an App installed in the customer's mobile phone (the user-end device 4) that matches the QR code information 200. If so, then the customer's mobile phone (the user-end device 4) will execute the matched App, and connect to the service-end device 3 of the restaurant through Internet by the App to establish a two-way connection therebetween. Then, the customer's mobile phone (the user-end device 4) can obtain the restaurant's service webpage so as to get the required services. For example, this operation can obtain the restaurant information (name, address, etc.), the restaurant's menu, the restaurant's webpage (e.g. FB, IG, etc.), or the likes. Based on the obtained information, the customer can further operate to, for example, order foods, browse the restaurant's webpage, view shopping details, shop online, or a combination thereof. In another case, after the customer has finished dining or consumption, he/she can operate the customer's mobile phone (the user-end device 4) to provide mobile payment information through the App to pay for the meal, or to provide the e-invoice account information through the App for receiving the e-invoice on-line. The applications after establishing the two-way connection are not limited in this disclosure. To be noted, if the customer's mobile phone (the user-end device 4) has not downloaded and registered the restaurant App, then the determining result may be negative, which means there is no installed App that matches the QR code information 200, and the mobile phone (the user-end device 4) can automatically query the customer whether he/she want to download the restaurant's App and register it to get further services.

In one embodiment, after the two-way connection is established, the user-end device 4 can also obtain an executable file from the service-end device 3. When the user-end device 4 executes the executable file, it can open a service webpage or download at least one service item from the service-end device 3. In addition, the obtained executable file can be stored in the user-end device 4. Therefore, the customer can click to execute the executable file to open the service webpage or download at least one service item corresponding to the service webpage from the service-end device 3 when needed. For example, the customer can repeat the meal ordering action multiple times.

In one embodiment, when the user-end device 4 appears in the preset range of the restaurant, the user-end device 4 will receive the QR code information 200 and register the QR code information 200 in the status bar of the user-end device 4. Then, for example, when the customer has finished the dining and leaved the restaurant, the user-end device 4 can automatically remove the registered QR code information 200 from the status bar. This design can avoid retaining too many useless or expired messages in the customer's mobile phone.

In one application example, the service providing system 5 and the service providing method of this embodiment can be applied to access control. In this embodiment, the user's mobile phone (the user-end device) has installed a specific App for access control. When the user (along with the mobile phone) enters the preset range of access control point, the user-end device will receive service identification information (e.g. QR code information). When the specific App for access control matches the service identification information, the mobile phone can automatically display the pass code (e.g. a QR code) for the access control device (the service-end device) to read to release the access control.

In summary, in the service providing system and method and the recording medium of this disclosure, the service-end device can provide at least one service identification information, and the user-end device installs at least one service application program. The service-end device outputs at least one activation signal. When a distance between the user-end device and the service-end device is within a preset range, the user-end device receives the at least one activation signal and obtains the service identification information provided by the service-end device according to the at least one activation signal. The user-end device determines whether the service application program is matched based on the service identification information. When determining the service application program is matched with the service identification information, the user-end device triggers the matched service application program, and the user-end device establishes a two-way connection to the service-end device through the service application program. Based on the above-mentioned service providing mechanism, the two-way connection between the user-end device and the service-end device can be automatically established, so that the user-end device and the service-end device can further generate interactions therebetween, thereby quickly selecting or providing the required service or information. This mechanism can improve the operation convenience.

In addition, in the electronic pad of this disclosure, the inputting unit is configured to retrieve the QR code from the QR code document, the processing unit is configured to generate a QR code information corresponding to the retrieved QR code, and the wireless signal outputting unit is configured to transmit the QR code information by wireless signal transmission. In other words, the electronic pad can initiatively output the QR code information by wireless signal transmission, while the user-end device can obtain the QR code in a passive manner. Therefore, the user-end device can obtain the required QR code to get further service without performing complicated operations.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:
1. A service providing system, comprising:
a service-end device used for providing at least one service identification information and sending at least one activation signal within a preset range; and a user-end device installing at least one service application program, wherein when the user-end device appears in the preset range, the user-end device performs following procedures:
receiving the at least one activation signal and obtaining the service identification information provided by the service-end device according to the at least one activation signal;
determining whether the service application program is matched based on the service identification information;
when determining the service application program is matched with the service identification information, triggering the matched service application program; and
establishing a two-way connection to the service-end device through the service application program.

2. The service providing system of claim 1, wherein the user-end device passively receives the service identification information.

3. The service providing system of claim 1, wherein before the procedure of triggering the matched service application program, the user-end device further performs a procedure:
when determining the service application program is matched with the service identification information, waiting for a trigger instruction;
wherein the procedure of triggering the matched service application program is performed after the user-end device receives the trigger instruction.

4. The service providing system of claim 3, wherein when determining the service application program is matched with the service identification information, the user-end device enters a lock-on status, and the user-end device starts to receive the trigger instruction after a user performs a unlock action to the user-end device.

5. The service providing system of claim 3, wherein the trigger instruction is to perform a user authentication, or to input a command and/or information by a user.

6. The service providing system of claim 1, wherein the service application program sets security authentication information when the service application program first interacts with the service-end device.

7. The service providing system of claim 1, wherein after the procedure of establishing the two-way connection to the service-end device through the service application program, the user-end device further performs a procedure of:
operating the service application program to select at least one service item provided by the service-end device; or
operating the service application program to provide at least one specific information to the service-end device; or
operating the service application program to provide at least one control command to the service-end device.

8. The service providing system of claim 7, wherein the service item comprises a meal ordering service, a shopping list service, an online shopping service, a payment system, an access control system, an elevator system, or a combination thereof; and the specific information comprises identity information, mobile payment information, e-invoice account information, preset configuration and information of the user-end device, or a combination thereof.

9. The service providing system of claim 1, wherein the service-end device comprises an electronic pad, a processing chip, a computer or a server, and the electronic pad, the processing chip, the computer or the server transmits the service identification information by wireless signal transmission.

10. The service providing system of claim 9, wherein the electronic pad generates the service identification information based on a paper document, and the processing chip, the computer or the server generate the service identification information based on digital data.

11. The service providing system of claim 1, wherein the two-way connection to the service-end device is established through the service application program based on preset configuration and information of the user-end device.

12. A service providing method applied with a service providing system, wherein the service providing system comprises a service-end device and a user-end device, the service-end device provides at least one service identification information, and the user-end device installs at least one service application program, the service providing method comprising:
the service-end device outputting at least one activation signal;
when a distance between the user-end device and the service-end device is within a preset range, the user-end device receiving the at least one activation signal and obtaining the service identification information provided by the service-end device according to the at least one activation signal;
the user-end device determining whether the service application program is matched based on the service identification information;
when determining the service application program is matched with the service identification information, the user-end device triggering the matched service application program; and
the user-end device establishing a two-way connection to the service-end device through the service application program.

13. The service providing method of claim 12, wherein before the user-end device triggers the matched service application program, the service providing method further comprises:
when determining the service application program is matched with the service identification information, the user-end device waiting for a trigger instruction;
wherein the user-end device triggers the matched service application program after the user-end device receives the trigger instruction.

14. The service providing method of claim 13, wherein when determining the service application program is matched with the service identification information, the user-end device enters a lock-on status, and the user-end device starts to receive the trigger instruction after a user performs a unlock action to the user-end device.

15. The service providing method of claim 13, wherein the trigger instruction is to perform a user authentication, or to input a command and/or information by a user.

16. The service providing method of claim 12, wherein the service application program sets security authentication information when the service application program first interacts with the service-end device.

17. The service providing method of claim 12, wherein after the user-end device establishes the two-way connection to the service-end device through the service application program, the service providing method further comprises:
operating the service application program of the user-end device to select at least one service item provided by the service-end device; or operating the service application program of the user-end device to provide at least one specific information to the service-end device; or operating the service application program of the user-end device to provide at least one control command to the service-end device.

18. The service providing method of claim 17, wherein the service item comprises a meal ordering service, a shopping list service, an online shopping service, a payment system, an access control system, an elevator system, or a combination thereof; and the specific information comprises identity information, mobile payment information, e-invoice account information, preset configuration and information of the user-end device, or a combination thereof.

19. The service providing method of claim 12, wherein the two-way connection to the service-end device is established through the service application program based on preset configuration and information of the user-end device.

20. A non-transitory, computer-readable storage medium storing application software that, when executed, performs the service providing method as recited in claim 12.

* * * * *